United States Patent [19]
Polomski et al.

[11] 4,049,094
[45] Sept. 20, 1977

[54] CENTRIFUGAL AND TORQUE RESPONSIVE LOCK UP CLUTCH FOR COUPLINGS

[75] Inventors: John Polomski, Birmingham; Willis Lorenz Schulz, Utica; Victor Joseph Specht, Fowlerville, all of Mich.

[73] Assignee: Borg-Warner Corporation, Chicago, Ill.

[21] Appl. No.: 620,461

[22] Filed: Oct. 7, 1975

[51] Int. Cl.² ............................................. F16H 45/02
[52] U.S. Cl. .............................. 192/3.31; 192/105 BA; 192/45.1; 192/107 M
[58] Field of Search .......... 192/105 BA, 103 B, 41 A, 192/45.1, 3.31, 3.28, 75, 54

[56] References Cited

U.S. PATENT DOCUMENTS

| 1,077,728 | 11/1913 | Mann | 192/105 BA |
| 2,106,423 | 1/1938 | Lavaud | 192/3.31 |
| 2,235,673 | 3/1941 | Dodge | 192/3.31 |
| 2,552,747 | 5/1951 | Strimple et al. | 192/105 BA |
| 2,626,034 | 1/1953 | Fawick | 192/75 X |
| 2,691,437 | 10/1954 | Dalrymple | 192/105 BA |
| 2,840,209 | 6/1958 | Binder | 192/105 BA |

FOREIGN PATENT DOCUMENTS

| 826,724 | 1/1938 | France | 192/105 BA |

Primary Examiner—Benjamin W. Wyche
Attorney, Agent, or Firm—Robert L. Zieg

[57] ABSTRACT

A speed responsive engaging mechanism, adapted for use in a hydrodynamic device to couple the turbine and impeller members, including an annular support secured to the turbine member having a series of cam surfaces formed in the periphery thereof with a series of engaging devices or friction shoes mounted on said ramps. The friction shoes engage with the impeller member at a predetermined speed of rotation of the turbine element. A series of springs engage each of the friction shoes to urge them toward a disengaged position.

9 Claims, 10 Drawing Figures

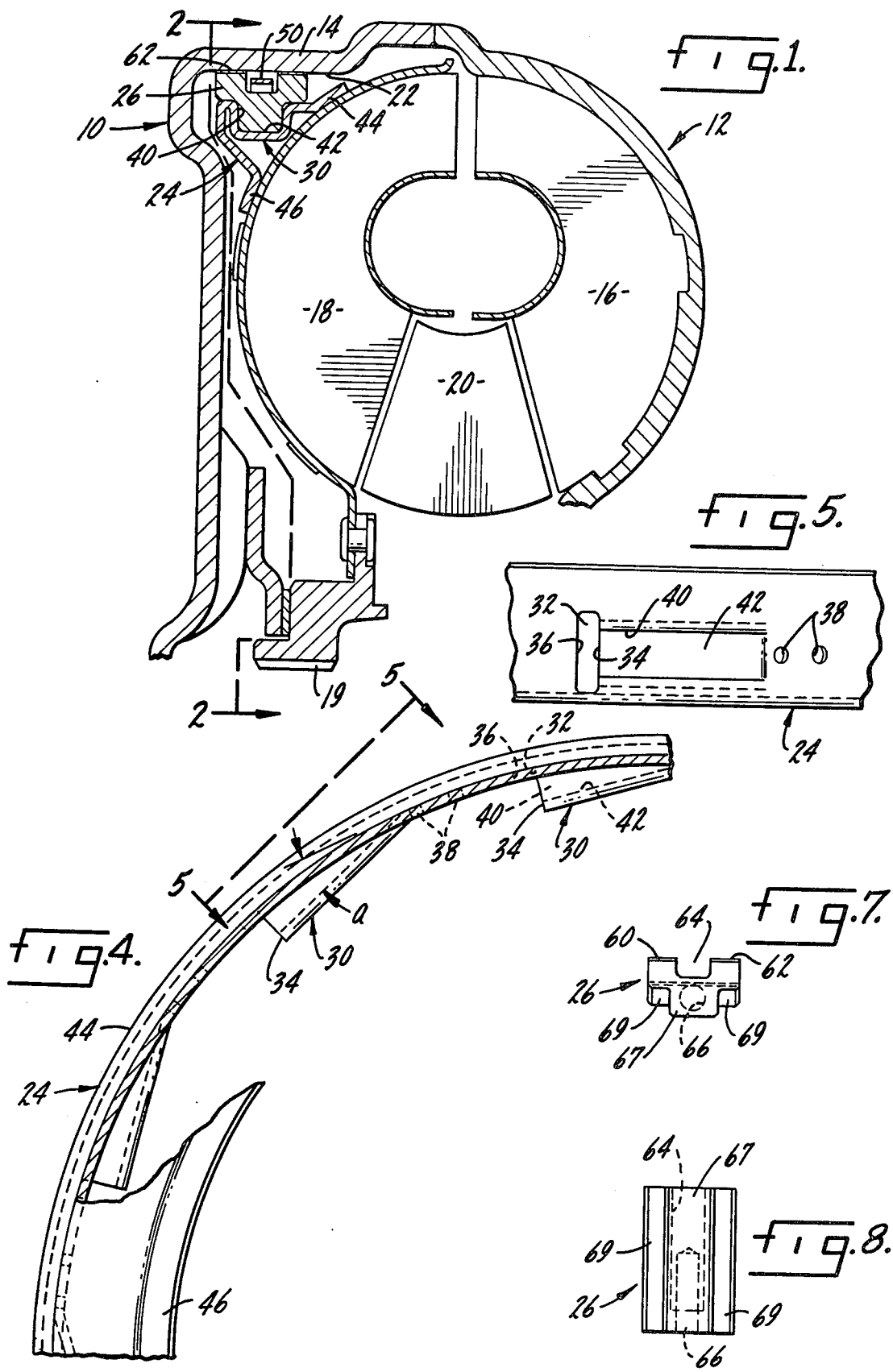

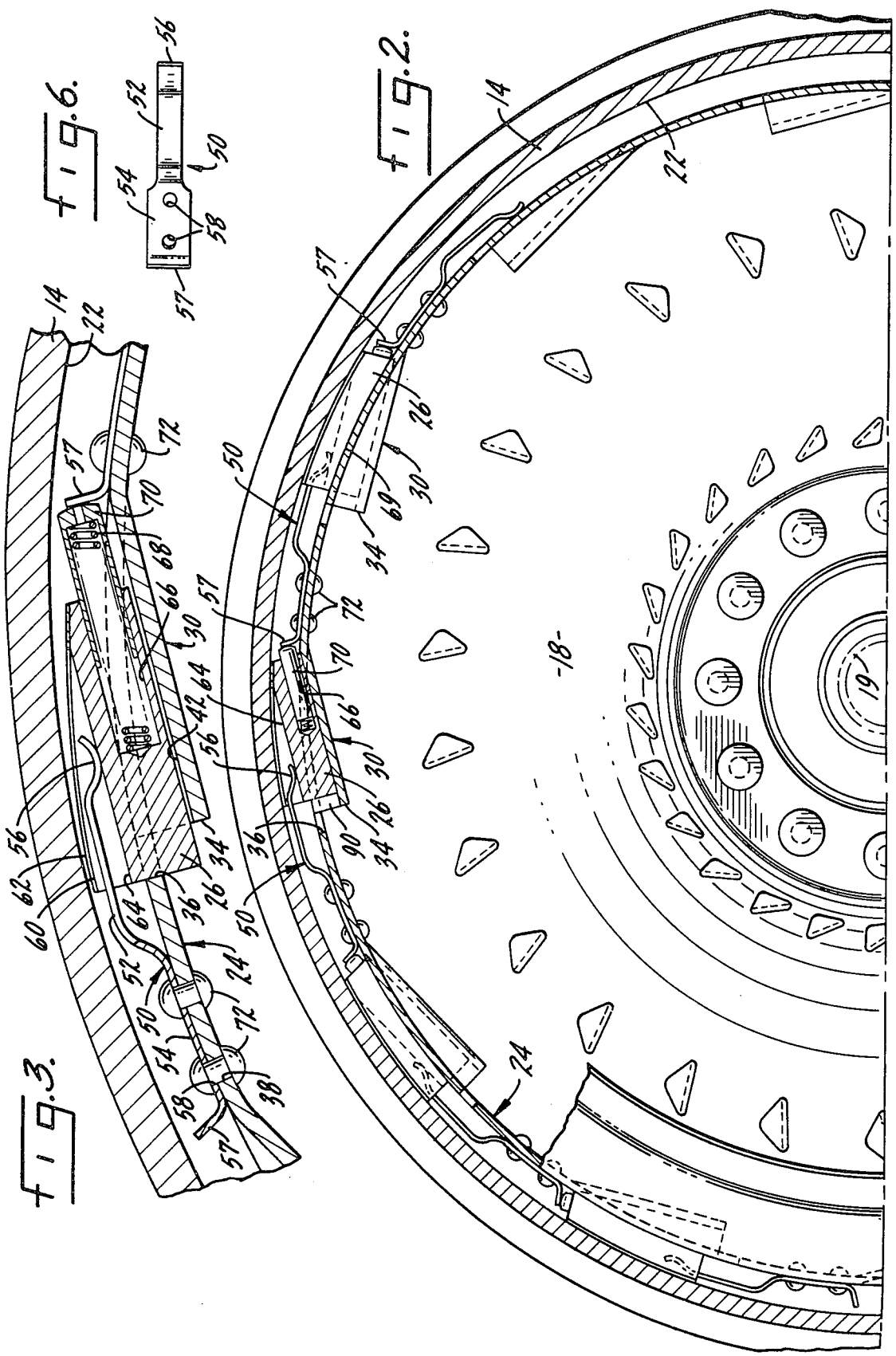

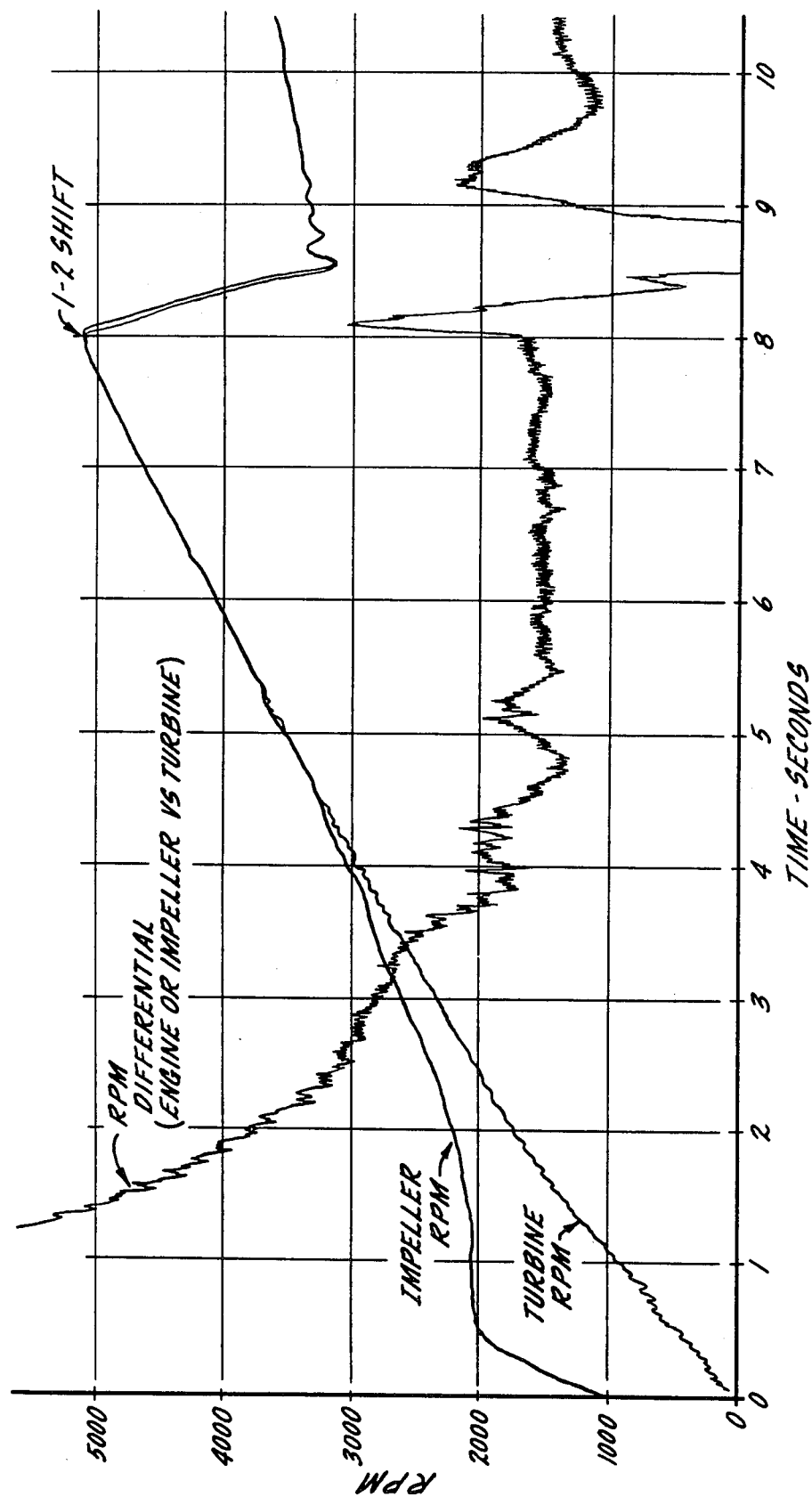

CENTRIFUGAL AND TORQUE RESPONSIVE LOCK UP CLUTCH FOR COUPLINGS

BACKGROUND OF THE INVENTION

1. Field of the invention

This application relates to the field of speed responsive engaging devices such as clutches.

2. Prior art

It has been known in the prior art that it is desirable to have a clutch to lock the impeller and turbine elements of a hydrodynamic device together to eliminate slippage therebetween under certain conditions to improve the efficiency of the device. It is further known that it is convenient to use the speed of rotation of an element as a signal to initiate engagement and disengagement of the clutch. The engagement is critical, for example, when the lock-up clutch is used in a hydrodynamic device in combination with an automatic transmission. During an automatic ratio change, it is desirable the clutch be disengaged so that torque changes occurring during the shift will not be harsh, due to the hydrodynamic device absorbing shocks. If the clutch in the hydrodynamic device remains engaged during a shift, the shift control to provide smooth shifts is more exacting since the normal shock absorbing characteristic of the hydrodynamic device is eliminated.

As pointed out, it is known to utilize speed responsive clutches as lock-up clutches in a hydrodynamic device. Normally, to insure that such clutches are engaged at the proper time, expensive and complicated controls of the mechanical, electric or hydraulic type are provided. Controls have been used to insure that the lock-up clutch is not engaged during an automatic shift. In addition, the clutch structures performing such functions are normally in themselves quite complicated.

Accordingly, it is the primary object of the present invention to provide a lock-up clutch for a hydrodynamic device of a simple design which will engage and disengage at the proper time without the use of external control mechanisms to determine the points of engagement and disengagement. Further, it is an object of the present invention to provide a speed and torque responsive clutch in a hydrodynamic device which can be physically accommodated within minimum axial and radial dimensions. Further, it is an important object of the present invention to provide a lock-up clutch for a hydrodynamic device which will automatically permit speed differentials within the device during specific operating conditions such as ratio change.

SUMMARY OF THE INVENTION

The present invention achieves the above enumerated objects by utilizing a speed and torque responsive, self-energizing wedge type, engagement of friction shoes. An annular sheet metal ring is provided which is secured to the turbine member of a hydrodynamic device which has formed therein series of ramp-like depressions, each containing a friction shoe with a friction lining thereon. Centrifugal force, moves the shoes radially outwardly to engage an inner annular surface on the impeller drive member. A series of leaf springs are connected to the annular ring and engage the friction shoes to resist their outward radial movement.

After initial frictional engagement of the shoes, the ramp-like depressions in which the shoes are mounted provide a wedging effect to urge the shoes into engagement. A hysteresis effect is provided, since the shoes will disengage due to the wedging action at a lower speed of rotation than that at which they engaged. In addition to the leaf springs, a coil spring is mounted in a bore in each of the friction shoes to resist movement of the friction shoes with respect to the ramp.

In addition to the hysteresis effect of the wedging engagement, the present invention further provides a torque sensitive function. It has been found that in torque surges which will occur on upshifts in an automatic transmission the capacity of the lock-up clutch is such that it will momentarily permit speed difference between the impeller and turbine elements. Additionally, in torque reversal conditions, such as will occur during a down shift when the torque tends to flow momentarily from the turbine member to the impeller member as opposed to the normal flow from the impeller member to the turbine member, the friction shoes momentarily permit speed difference between the impeller and turbine members. It is to be understood that such permission of speed difference (or slipping) between turbine and impeller elements by the lock-up clutch will be characterized herein as a release of the clutch although the friction shoes may remain in contact during this condition. The automatic release during ratio change is extremely important to maintain the shock absorbing function of the torque converter during such ratio changes.

BRIEF DESCRIPTION OF THE DRAWINGS

FIG. 1 is a cross-sectional view through a hydraulic torque converter structure having a speed responsive clutch embodying the principles of the present invention;

FIG. 2 is a cross-sectional view taken along the lines 2—2 of FIG. 1;

FIG. 3 is an enlarged sectional view of a portion of FIG. 2;

FIG. 4 is a partial sectional view of the annular ring shown in FIG. 1;

FIG. 5 is a projected view on the line 5—5 of a portion of the ring illustrated in FIG. 4;

FIG. 6 is a top view of the leaf spring illustrated in FIGS. 1 and 2;

FIG. 7 is an end view of the friction shoes illustrated in FIG. 3;

FIG. 8 is a bottom view of the friction shoes illustrated in FIG. 7;

FIG. 10 is a chart of test results.

BRIEF DESCRIPTION OF THE PREFERRED EMBODIMENT

Figure 9:
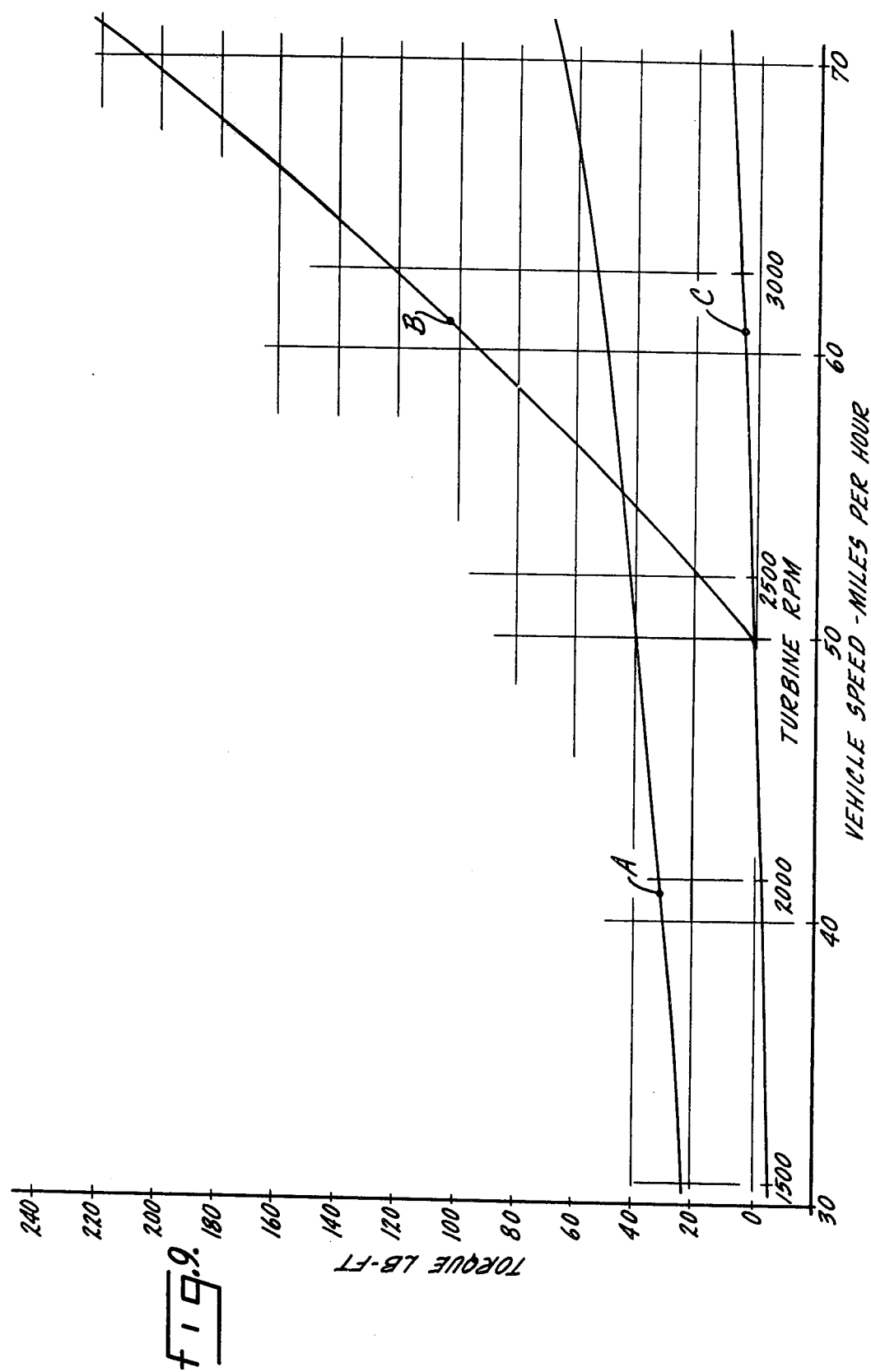
FIG. 9 is a chart of torque-speed characteristics of the present invention.

Referring to FIG. 1, an improved lock-up clutch or engaging mechanism 10 is illustrated. The clutch 10 is shown in location in a hydrodynamic device 12 of the type normally referred to in the art as a hydraulic torque converter, having a drive shell 14 connected to drive a vaned impeller member 16 in a known manner. The hydraulic torque converter 12 includes a vaned turbine member 18 driven hydrodynamically by impeller 16 and a stator member 20. The improved lock-up clutch 10 is operative to lock the turbine 18 to the impeller 16 by means of frictional engagement between the clutch 10 and an internal annular surface 22 of shell 14. The impeller shell 14 is of conventional construction as, for example, as illustrated in U.S. Pat. No. 3,859,872 showing the connection between the shell and the impeller member. In a vehicle installation shell 14 is connected to the vehicle engine to be driven thereby. The turbine 18 is splined at 19 so as to be connected to a transmission input shaft to drive some in response to rotational drive of the turbine by the impeller.

Referring to FIGS. 1, 2 and 4, the improved lock-up clutch 10 is generally comprised of an annular sheet metal reaction ring or support member 24 which is operatively associated with a plurality of engaging devices or friction shoes 26.

Referring to FIGS. 4 and 5, reaction ring 24 is illustrated in detail and is comprised of an annular formed sheet metal ring having a series of ramps or cam means 30 formed around the periphery thereof. Ramps 30 may be equally spaced around the periphery of support 24 although such arrangement is not necessary as long as a rotationally balanced condition is maintained. The ramps 30 are formed by first punching a series of transverse slots 32 and then deforming the ramp 30 radially inwardly from the annular ring 24 as shown in FIG. 4. The end portion 34 of the ramps 30 being originally a portion of the slots 32. An abutting surface 36 also forms a part of slots 32. The ramp 30 has an angle $a$ with respect to a tangent to the annular ring 24 at the intersection of the general plane of ramp 30. One operative embodiment operated suitably with angle $a$ at approximately a 6°. Between the ramps 30 and around the periphery of annular member 24, pairs of rivet holes 38 are pierced in ring 24. When each of the ramps 30 are formed, a wedged shaped aperture or depression 40 is formed in the annular ring 24. Each aperture or depression 40 has a bottom surface 42 comprising the cam or wedge surface which is in engagement with friction shoes 26. The annular ring 24 includes a formed curved outer annular portion 44 and a formed inner annular portion 46. The portion 44 and 46 are constructed to properly mate with the curved outer surface of the turbine 18 as illustrated in FIG. 1. The ring 24 can thus be assembled to the turbine 18 and secured thereto by spot welding or other techniques well-known in the art.

Referring to FIGS. 3 and 6, a leaf spring 50 is illustrated having a spring arm section 52 and a support section 54. Spring portion 52 includes an arcuate engaging surface 56 and support portion 54 has two rivet holes 58 pierced therein. Support section 54 has a reaction portion 57 thereon extending upwardly as seen in FIG. 3 at an angle from support section 54.

Referring to FIGS. 3, 7 and 8, friction shoes 26 are illustrated in detail. Friction shoes 26 comprise generally rectangular blocks having formed thereon an arcuate surface 60 which optionally may have bonded or otherwise secured thereto a friction lining 62 which may be, for example, a paper type friction lining as is known in clutches and brake band devices. The shoes have a longitudinally extending U-shaped groove 64 formed therein in the surface 60. Also provided in the shoes 26 is a bore 66 which is adapted to receive a spring as will be described. The shoes 26 have a downwardly extending central rectangular portion 67 extending the length thereof with a pair of support shoulders 69 on either side of portion 67. When the shoes 26 are in place in the torque converter 12, the portions 67 are received within apertures 40 of ring 24 with shoulders 69 resting on the annular surfaces on either side of apertures 40.

Referring to FIG. 2, it can be seen that the shoe 26 has assembled within the bore 66, a coil return spring 68. Spring 68 is retained within a spring cap 70 which is urged out of bore 66 by the spring 68. The shoes 26 are held in place and urged radially inwardly by engagement of engaging portion 56 of spring 50 within the groove 64 in shoes 26. Rivets 72 are provided extending through holes 38 in reaction ring 24 and holes 58 in leaf spring 50. Thus, leaf springs 50 are securely held in place by rivets 72. Spring 50, being engaged within the groove 64, holds friction shoes 26 (as illustrated in FIG. 2) out of engagement with inner annular surface 22 of shell 14.

Reaction portion 57 of spring 50 is engaged by cap member 70 of the adjacent friction shoe 26. Thus, as illustrated in FIG. 2, around the periphery of the reaction ring 24 are provided a series of the friction shoes 26 urged radially inwardly by springs 50 out of engagement with annular surface 22; and held in position by portion 57 of spring 50, the engaging portion 56 of an adjacent spring 50, and engagement of the friction shoe 26 with surface 36 of slots 32.

The operation of the lock-up clutch 10 of the present invention is that when a predetermined speed of turbine 18 is reached, sufficient centrifugal force acts on the shoes 26 to urge them radially outwardly against the force of springs 50 and 68 and tending to engage arcuate friction surface 60 with annular inner surface 22. At this time, the friction shoes 26 will attempt, through frictional engagement with impeller shell 14, to lock turbine 18 to impeller shell 14. This frictional engagement energizes the device such that the ramps or cams 30 tend to further engage friction shoes 26 by means of a wedging action. The lock-up clutch 10 is thus self-energizing in the engaging direction, due to the wedging effect of ramps 30 on shoes 26.

Referring to FIGS. 2 and 3, between the engaged and disengaged position of shoes 26, the shoes 26 move in substantially circumferential direction as illustrated by the space 90 between the edge 36 and the end of the shoe 26. The substantially circumferential movement of shoes 26 is comprised of both arcuate movement with respect to shell 14 as well as chordal movement of shoes 26 with respect to shell 14 along the ramp surface 42. This movement of shoes 26 represents the wedging action of shoe 26 during engagment.

It has been found that due to the wedging action, a desired hysteresis effect is inherent in the present structure in that although the device tends to lock up and engage the friction shoes 26 at a predetermined RPM, the wedging action holds the shoes 26 in engagement such that they will not come out of engagement due to action of springs 50 and 68 until a lower RPM than the engaging RPM is reached. As for example, in one test of the device, under dynamometer conditions, it has been shown that the clutch 10 would lock up between 1600 and 1660 RPM, and that under the same conditions of torque load, the clutch 10 did not release upon a decrease in RPM until an RPM range of between 1550 and 1450 was reached. Thus, due to the wedging engagement of friction shoes 26, hunting, i.e., rapid changes between lock up and released positions of lock-up clutch 10, is prevented.

It is to be understood that the use of the term "disengaged" herein is meant to indicate a condition in which shoes 26 move radially inwardly out of contact with surface 22. When the term "released, " as applied to clutch 10, is used herein, it is intended to include a condition in which shoes 26 may still be in contact with surface 22 but the engaging forces are such that slipping of surface 22 with respect to shoes 26 may take place, or in other words, turbine 18 and impeller 16 may rotate at different speeds. Of course, the term released is also meant in its broad sense to include the disengaged condition described above.

Referring to FIG. 9, in which a torque-speed chart is given, line A represents the torque of the output shaft of the transmission when driving in third or 1:1 ratio through the gearing. Line B represents the total torque capacity of the clutch mechanism 10 at various turbine speeds. The "Y" axis of the chart is calibrated in LB. - FT. of the torque and the "X" axis indicates the turbine speed in RPMs as well at the vehicle speed in miles per hour.

The "A" line is plotted from an actual test in a vehicle showing the output shaft torgue usually called "roadload" torque while the vehicle is operating in 1:1 ratio through the transmission. The "B" line represents calculated values of the torque capacity of clutch 10 which can be calculated since the torgue applied at each RPM is indicated and the centrifugal force applied by each shoe 26 can be determined. By torque capacity of the clutch, it is meant the maximum torque the clutch can transmit before slipping will occur between shoes 26 and surfaces 22.

The line "C" represents the calculated value of the torque capacity of the clutch due only to centrifugal force, not counting the torque capacity contributed by the wedge effect of ramps 30.

It can be seen that at the lower RPMs, before the wedge takes effect, lines B and C coincide. Until about 2400 RPM of the engine, the torque capacity of clutch 10 increases very gradually. This gradual increase represents increasing centrifugal force urging shoes 26 against surface 22. At the 2400 RPM point, the torque transmittal capacity between shoes 26 and surface 22 is great enough to induce the shoes to begin moving up ramp 30 introducing a wedging engagement effect and the total torque capacity of clutch 10 rises along line B.

From study of the curves of FIG. 9, it will be apparent that the clutch 10 will lock-up and connect turbine 18 to impeller 16 upon increasing engine RPM when the B line crosses the A line or in other words when the torque capacity of clutch 10 exceeds the torque transmitted through the drive line represented by line A when operating in the 1:1 ratio.

Anytime the throttle of the vehicle is suddenly depressed to demand higher torque, the drive-line torque will be higher on the chart than line A such that torque capacity of clutch 10 may be exceeded causing clutch 10 to release and allowing the hydraulic torque converter to return to slipping condition, which is desired at such times. This condition may also occur on upshifts when a sudden surge or increase in torque will occur momentarily, as explained previously.

When a torque reversal occurs in the drive-line, due to the inherent characteristics of clutch 10, the wedging effect is removed, and the torque capacity of clutch 10 drops to the value shown by line C. This explains why the clutch momentarily releases on down-shifts, since a torque reversal occurs at such times. As previously explained, during shifting, release of clutch 10 is desired to allow the converter to return to its shock absorbing characteristics.

It has also been illustrated during test work that upon shifting or ratio changing in an automatic transmission with the present device installed, the torque pulse or reversal which occurs during a shift allows the lock-up clutch 10 to release under these conditions. This inherent feature of the present design is extremely important in that automatic shifts are much smoother when a hydraulic torque converter is operating in its released or normal manner; and if a torque converter is locked up, as, for example, by a lock-up clutch at the time of the shift, the shift could be much harsher than desirable.

Referring to FIG. 10, a test of the present invention in a vehicle is shown which was a full throttle acceleration test of the unit. As indicated on the drawing, a tracing is made of the impeller RPM and a tracing of the turbine RPM. As will be apparent, when the impeller and turbine RPMs are the same, as occurred at approximately 3350 RPMS in this test, the clutch 10 is in engaged or locked-up position. It is known that the clutch is locked up at this time since under normal conditions in a hydraulic torque converter the turbine usually is rotating slightly slower than the impeller by about 5%. Also illustrated on the chart is an RPM differential curve which records the difference in RPM between the impeller and the turbine. As is apparent, the difference in RPM changes from the 0 turbine RPM point on the 0 time line of the chart to a point at about the 5 second period where the difference ceases to exist, thus illustrating that a locked-up condition has occurred. The relatively horizontal part of the differential curve coincides with the merging of the impeller and turbine RPM curves. The RPM differential curve is a very rough tracing due to the sensitivity of the measuring equipment used, however, it is sufficient to indicate changes in the differential RPM. The RPM differential curve changes dramatically at the point of the 1-2 shift which occurs at 5100 RPMs, thus illustrating that the lock-up clutch released at this point to provide a partially open torque converter during the shift. The fact that the clutch is released is further illustrated by the fact that the turbine and impeller RPM lines again separate during the shift.

As stated earlier, the shoes 26 have a friction lining 62 thereon which may be of a paper type. In one operative embodiment of the present device shoes 26 were made of aluminum and support 24 was made of sheet steel. It will be apparent that the coefficient of friction of the friction lining is different from that of the shoes 26 surface which engages support 24. Thus, with the present invention the device may be altered to have different engaging characteristics by changing either the material of the friction lining or the material of shoe 26, or both. It has been found that it is highly desirable to have the friction lining of higher coefficient of friction than the lower surface of the shoes so that the force required to move the shoes with respect to the ramps 30 will be less than that to move shoes 26 with respect to surface 22 considering equal normal forces between shoes 26 and ramps 30 and between shoes 26 and surface 22.

As described herein, support 24 is a single annular piece, made of sheet metal, and having ramps 30 formed therein by sheet metal forming techniques. It is contemplated that the clutch 10 could be constructed with ramps 30 formed of individual sheet metal structures, each separately secured to turbine 18 by welding or other known techniques. Alternatively, ramps 30 could be formed within the outer shell of turbine 18 prior to assembly of fluid directing blades therein, the shell having dimensions to allow for formation of ramps therein around the periphery, while at the same time, providing adequate space for fluid flow paths through the turbine element. In addition, it is apparent that alternative forms of spring devices may be used to urge shoes 26 down ramps 30 and out of engagement with surface 22. For example, a single garter type spring could encircle all shoes 26 and urge them out of engagement, grooves 64 in shoes 26 in such case being of appropriate depth to accommodate the garter spring.

From the above, it will be apparent that the present invention provides a speed responsive clutch which achieves unique results as a lock-up clutch for an hydrodynamic device having all the desired operating characteristics for a clutch in this environment yet involves very few parts. These characteristics, achieved by the present invention are: lock-up of turbine and impeller elements at proper times; release during automatic ratio change to use the natural shock absorbing features of the hydrodynamic device; no hunting between engaged and released conditions; smooth engagement and disengagement; and no requirements for complex mechanical, hydraulic, or electronic speed sensitive controls to properly time engagement and disengagement.

We claim:

1. An engaging mechanism comprising, first and second relatively rotating members, an annular sheet metal support having a periphery and fixed to said first member, a plurality of friction shoes mounted between said support and said second member, cam means on said support in engagement with said shoes, said shoes having a frictional surface thereon, said cam means being formed of the material of said support and extending radially inwardly from said periphery, centrifugal force acting to urge said devices to move into engagement with said second member at a given speed of rotation to lock said members for rotation together, said cam means comprising a series of ramps distributed around the periphery of said support, said cam means acting after initial engagement to wedge said shoes between said support and said second member over the entire arcuate length of said shoes, the torque capacity of said mechanism being so designed that said engagement will release during torque surges and torque reversals through said mechanism to momentarily allow relative rotation between said members.

2. A mechanism as claimed in claim 1 wherein said cam means comprises a series of ramps distributed around the periphery of said support which are formed from said support by metal forming techniques, said support being constructed of sheet metal.

3. A speed responsive clutch mechanism for use in a hydraulic torque converter having impeller and turbine elements comprising, an annular support fixed to said turbine, a plurality of friction devices mounted between said support and said impeller, cam means on said support in engagement with said devices, said devices having a frictional surface thereon, centrifugal force acting to urge said devices to move radially into engagement with said impeller at a given speed of rotation to lock said members for rotation together, said cam means acting after initial engagement to wedge said devices between said support and said impeller over the entire arcuate extent of said devices thereby increasing the torque capacity of said clutch and said mechanism allowing relative rotation between said impeller and turbine members upon torque surges and torque reversals through the clutch mechanism, wherein said cam means comprise a series of ramps distributed around the periphery of said support which are formed from said support by metal forming techniques, said support being constructed of sheet metal.

4. A friction engaging mechanism wherein two relatively rotating members are to be drivingly connected for rotation together comprising, an annular support connected to one of said members having a series of ramps formed therein, a friction shoe mounted on each of said ramps between said support and said other member, said shoes having a surface in engagement with said ramps, said shoes having a friction lining thereon adapted to engage with said other member, said shoes being movable outwardly in response to centrifugal force to engage with said other member and said ramps acting to wedge said shoes further into engagement after initial frictional engagement with said other member, said frictional lining having different coefficient of friction characteristics than said shoe surface and wherein said support is comprised of steel, said shoes are aluminum, and said friction lining is of a paper material.

5. In a friction device adapted to driving connect two relatively rotating members, a support connected to one of said members, a series of friction shoes mounted between said support and said other member, each of said shoes being mounted on a ramp formed in said support, said shoes being adapted to move up said ramp into wedging engagement in response to frictional contact between said shoes and said other member, a series of spring members mounted on said support having an arm urging said shoes inwardly, said spring members having a reaction portion thereon, each of said shoes having mounted therein a spring means contacting said reaction portion of one of said spring members to resist movement of said shoe up said ramp whereby said shoes are urged in radial and substantially circumferential directions.

6. A device as claimed in claim 5, wherein said spring means comprise coil springs mounted in said shoes.

7. An engaging mechanism for a hydrodynamic device having driving and driven elements including friction means mounted between said elements, centrifugal force acting to urge said friction means to move into engagement with one of said elements to lock said elements for rotation together, and cam means formed in an annular sheet metal ring attached to one of said elements acting after initial engagement of said friction means to move same into wedging engagement with said one element, said cam means extending inwardly from the periphery of said ring whereby said engaging mechanism is both torque and speed responsive and the wedging engagement of said friction means with said one element being effective to increase the torque transmittal capacity of the engaging mechanism to provide sufficient torque capacity to drive the vehicle while at the same time allowing release of the engaging mechanism on torque surges or reversals through said hydrodynamic device.

8. An engaging mechanism as claimed in claim 7, wherein the wedging engagement of said friction means with said one element is effective to increase the torque transmittal capacity of the engaging mechanism while at the same time allowing release of the engaging mechanism on torque surges or reversals through said hydrodynamic device.

9. An engaging mechanism as claimed in claim 7, wherein said one element is said driving element and said means acting after initial engagement comprises support means on said driving element having cam means in engagement with said friction means.

* * * * *